(No Model.)

D. N. BAXTER.
DROPPER ACTUATING MECHANISM FOR PLANTERS.

No. 366,144. Patented July 5, 1887.

Witnesses.
Sarepta Specht
G. P. Kramer.

Inventor.
Daniel N. Baxter
By R. S. & A. P. Lacey
Attys.

UNITED STATES PATENT OFFICE.

DANIEL N. BAXTER, OF ROODHOUSE, ILLINOIS, ASSIGNOR OF ONE-HALF TO WILLIAM SHORT, OF SAME PLACE.

DROPPER-ACTUATING MECHANISM FOR PLANTERS.

SPECIFICATION forming part of Letters Patent No. 366,144, dated July 5, 1887.

Application filed April 14, 1887. Serial No. 234,788. (No model.)

*To all whom it may concern:*

Be it known that I, DANIEL N. BAXTER, a citizen of the United States, residing at Roodhouse, in the county of Greene and State of Illinois, have invented certain new and useful Improvements in Dropper-Actuating Mechanism for Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to dropper-actuating mechanism for planters, and has for its object the production of a single and compact device which can be readily applied to any planter for dropping the seed in check-rows.

The improvement consists of a beam or sill designed to be affixed to the planter, short cross-bars at each end, a pair of grooved rollers mounted in recesses in the cross-bars, two tappets pivoted to the beam between the two short cross-bars, one of said tappets being extended below the pivotal point, the rod connecting the tappets on opposite sides of their pivotal points, whereby they move simultaneously toward or away from each other, and the connection for joining the seed dropper with said rod.

The improvement further consists in the novel features hereinafter more fully set forth, claimed, and shown in the annexed drawings, in which—

Figure 1:
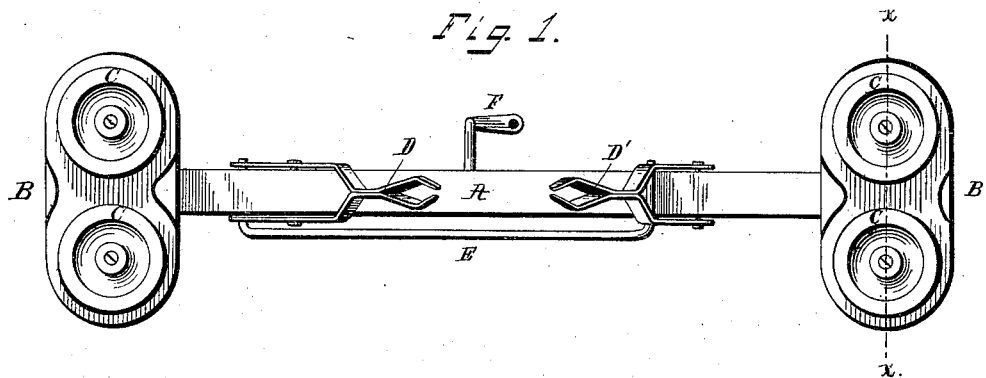
Figure 2:
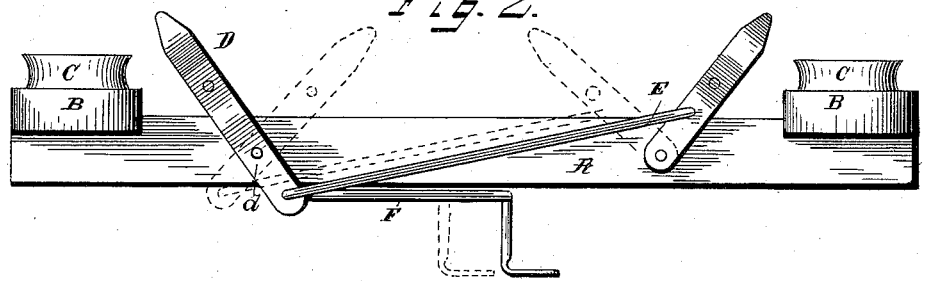
Figure 3:
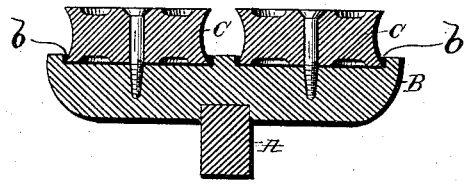

Figure 1 is a plan view of the dropper actuating mechanism embodying my invention; Fig. 2, a side view showing the operation by dotted lines; Fig. 3, a cross-section on the line X X of Fig. 1.

The beam A may be of any desired length, and the short cross-bars B, of appropriate pattern, are secured to each end thereof. The pairs of grooved pulleys C are journaled upon the short cross-bars, and are seated in depressions or recesses $b$ formed therein, which are of sufficient depth to receive the lower flange of the pulleys and prevent the check cord or wire getting beneath the pulleys or between them and the cross-bars. The tappets D and D' are pivoted to the beam between the cross-bars, one of said tappets, as D, extended below the pivotal point at $d$, and the rod E connects the end of the extension $d$ with the tappet D' at a distance from and above its pivotal point or support, so that both tappets will simultaneously move toward or away from each other, respectively. The connection F, connected with the extension of the tappet D, is adapted to be fastened at its free end with the dropper slide or device of the planter and communicate motion thereto from dropping the seed.

In practice the beam is to be attached to the planter in the desired manner, and the free end of the connection F is to be fastened to the dropper-slide or appliance, and the check-cord (not shown) is passed between the pairs of pulleys and between the spring-fingers of the tappets, in the usual manner. As the planter is drawn over the field the check cord alternately actuates the tappets, which, through the rod E and connection F, transmit motion to the dropper appliances and plants the seed, in the usual manner.

Having thus described my invention, what I claim, and desire to secure by Letters Patent, is—

The herein shown and described dropper-actuating mechanism for planters, composed of the beam, the two short cross-bars having a recess at each end, arranged transversely of the beam and fixedly secured to each end thereof, respectively, the two pairs of grooved pulleys having their lower sides wholly fitted in the recesses of the short bars and journaled thereto, the two tappets embracing the sides of the beam and pivoted thereto, one of said tappets being extended below the beam, the rod connecting the lower end of the extended tappet with the other tappet above the pivotal support, and the connection F, secured at one end to said extended end, substantially as and for the purpose specified.

In testimony whereof I affix my signature in presence of two witnesses.

DANIEL N. BAXTER.

Witnesses:
 CHARLES NEWTON MOORE,
 WILLIAM SHORT.